United States Patent
Cherney et al.

(10) Patent No.: US 11,501,619 B2
(45) Date of Patent: Nov. 15, 2022

(54) WORKSITE CLASSIFICATION SYSTEM AND METHOD

(71) Applicant: Deere & Company, Moline, IL (US)

(72) Inventors: Mark J. Cherney, Potosi, WI (US); Luke M. Kerns, Edgewood, IA (US)

(73) Assignee: Deere & Company, Moline, IL (US)

( * ) Notice: Subject to any disclaimer, the term of this patent is extended or adjusted under 35 U.S.C. 154(b) by 323 days.

(21) Appl. No.: 16/691,988

(22) Filed: Nov. 22, 2019

(65) Prior Publication Data

US 2021/0158674 A1 May 27, 2021

(51) Int. Cl.
*G08B 13/196* (2006.01)
*G06Q 50/08* (2012.01)
(Continued)

(52) U.S. Cl.
CPC .... *G08B 13/19647* (2013.01); *B60K 31/0008* (2013.01); *B60Q 9/008* (2013.01); *E02F 9/262* (2013.01); *G06Q 50/08* (2013.01); *G06V 40/10* (2022.01); *G08B 13/19645* (2013.01); *G08B 13/19682* (2013.01); *G08B 13/19684* (2013.01)

(58) Field of Classification Search
CPC ........ G07C 9/22; G07C 9/00; G06K 9/00624; G06K 9/00805; H04W 4/029; G06Q 10/063114
See application file for complete search history.

(56) References Cited

U.S. PATENT DOCUMENTS 8,478,040 B2    7/2013    Brogren et al.
8,842,015 B2    9/2014    Scott
(Continued)

FOREIGN PATENT DOCUMENTS

EP    2919150 A1 *    9/2015    ......... G06K 9/00624
EP    2919150 A1    9/2015
(Continued)

OTHER PUBLICATIONS

Fremont, Vincent, et al. "Vision-based people detection system for heavy machine applications." Sensors [online] vol. 16, No. 1, pp. 128, Jan. 20, 2016 [retrieved on Aug. 6, 2019]. Retrieved from Internet: <https://www.ncbi.nlm.nih.gov/pmc/articles/PMC4732161/.
(Continued)

*Primary Examiner* — Mirza F Alam

(57) ABSTRACT

A worksite classification system and method for classifying persons at a worksite is disclosed. The worksite classification system can include a sensor system configured to capture images of persons located at the worksite. An electronic data processor communicatively coupled to the sensor system and comprising a computer readable storage medium having machine readable instructions that, when executed by the electronic data processor, cause the processor to: determine an identity of the persons based on one or more identifying characteristics associated with the persons; determine if the persons have authorization access to enter to one or more operational zones at the worksite based on the identity of the persons and an associated access level; and generate an alert notifying an operator when persons without authorization access enters the one or more operational zones.

17 Claims, 8 Drawing Sheets

(51) Int. Cl.
*B60K 31/00* (2006.01)
*B60Q 9/00* (2006.01)
*E02F 9/26* (2006.01)
*G06V 40/10* (2022.01)

(56) References Cited

U.S. PATENT DOCUMENTS

| | | |
|---|---|---|
| 10,385,542 B2 | 8/2019 | Shike et al. |
| 10,385,543 B2 | 8/2019 | Shike et al. |
| 2005/0002530 A1* | 1/2005 | Kogan .................... G07C 9/22 |
| | | 348/E5.002 |
| 2014/0307076 A1 | 10/2014 | Deutsch |
| 2016/0292846 A1* | 10/2016 | Sprock .................. G05B 19/00 |
| 2019/0003153 A1* | 1/2019 | Shike ................... G01B 11/245 |
| 2019/0132884 A1* | 5/2019 | Agiwal ............. H04W 74/0833 |

FOREIGN PATENT DOCUMENTS

| | | |
|---|---|---|
| JP | 2009193494 A | 8/2009 |
| KR | 1020180129157 A | 12/2018 |
| WO | 2015086855 A1 | 6/2015 |

OTHER PUBLICATIONS

German Search Report issued in application No. DE102020213360.3 dated Oct. 4, 2022 (06 pages).

* cited by examiner

756

Prompt: "Is this your laborer for the day?"
Operator Input: "Yes, that is John"

Prompt: "Where should John be allowed today?"
Operator Input: "Front work zone and spotter zone only"

Prompt: Should anyone else be allowed in the work zone?"
Operator Input: "No"

Prompt: "OK, I will alert you if anyone else enters the work zone. Is that Bob your spotter?"
Operator Input: "Yes, that is Bob"

Prompt: "Where should Bob be allowed today?"
Operator Input: "Spotter zone only"

Prompt: "Should anyone else be allowed in the spotter zone other thank John and Bob?
Operator Input: "No"

Prompt: "OK, I will alert you if anyone else enters the spotter zone."

FIG. 8

WORKSITE CLASSIFICATION SYSTEM AND METHOD

RELATED APPLICATIONS

The application relates to U.S. application Ser. No. 16/560,303, titled Object Detection System and Method, filed Sep. 4, 2019, which is hereby incorporated by reference in its entirety.

FIELD OF THE DISCLOSURE

The present disclosure relates generally to classification systems, and, more particularly, to a worksite classification system and method for off-road or industrial vehicles.

BACKGROUND OF THE DISCLOSURE

In industrial applications, worksite safety procedures are important to ensure the safety of pedestrians, operators, workmen, and other personnel located in the worksite. Generally, for safety purposes, industrial safety standards require that only site personnel be present in a worksite, which, in turn helps to reduce operator related hazards and accidents. Additionally, there is a desire for detection mechanisms which identify when persons are near heavy machinery or equipment.

To address such concerns, some conventional approaches employ the use of RFID sensors or retroreflective sensors to detect people and objects. Drawbacks to such approaches include decreased scalability via software, as well as ineffective and limited object differentiation.

As such, there is a need in the art for an improved worksite classification system that provides increased detection accuracy.

SUMMARY OF THE DISCLOSURE

According to an aspect of the present disclosure, a worksite classification system for classifying persons at a worksite is disclosed. The worksite classification system can include a sensor system that is configured to capture images of persons located at the worksite. An electronic data processor communicatively coupled to the sensor system. The electronic data processor comprising a computer readable storage medium having machine readable instructions that, when executed by the electronic data processor, cause the processor to: determine an identity of the persons based on one or more identifying characteristics associated with the persons; determine if the persons have authorization access to enter to one or more operational zones at the worksite based on the identity of the persons and an associated access level; and generate an alert notifying an operator when persons without authorization access enters the one or more operational zones.

According to another aspect of the present disclosure a method is disclosed. The method including capturing images of persons located in one or more operational zones at a worksite; determining an identity of the persons captured in the image based on one or more identifying characteristics associated with the persons; determining, based on the identity of the persons and an associated access level, if the persons have authorization access to enter the one or more operational zones; and generating an alert to notify an operator when persons without authorization access enters the one or more operational zones.

Other features and aspects will become apparent by consideration of the detailed description and accompanying drawings.

BRIEF DESCRIPTION OF THE DRAWINGS

The detailed description of the drawings refers to the accompanying figures in which:

FIG. 8 is an illustration of a setup screen display of a user interface of the worksite classification system of FIG. 2 according to an embodiment;

Like reference numerals are used to indicate like elements throughout the several figures.

DETAILED DESCRIPTION OF THE DRAWINGS

Figure 1:
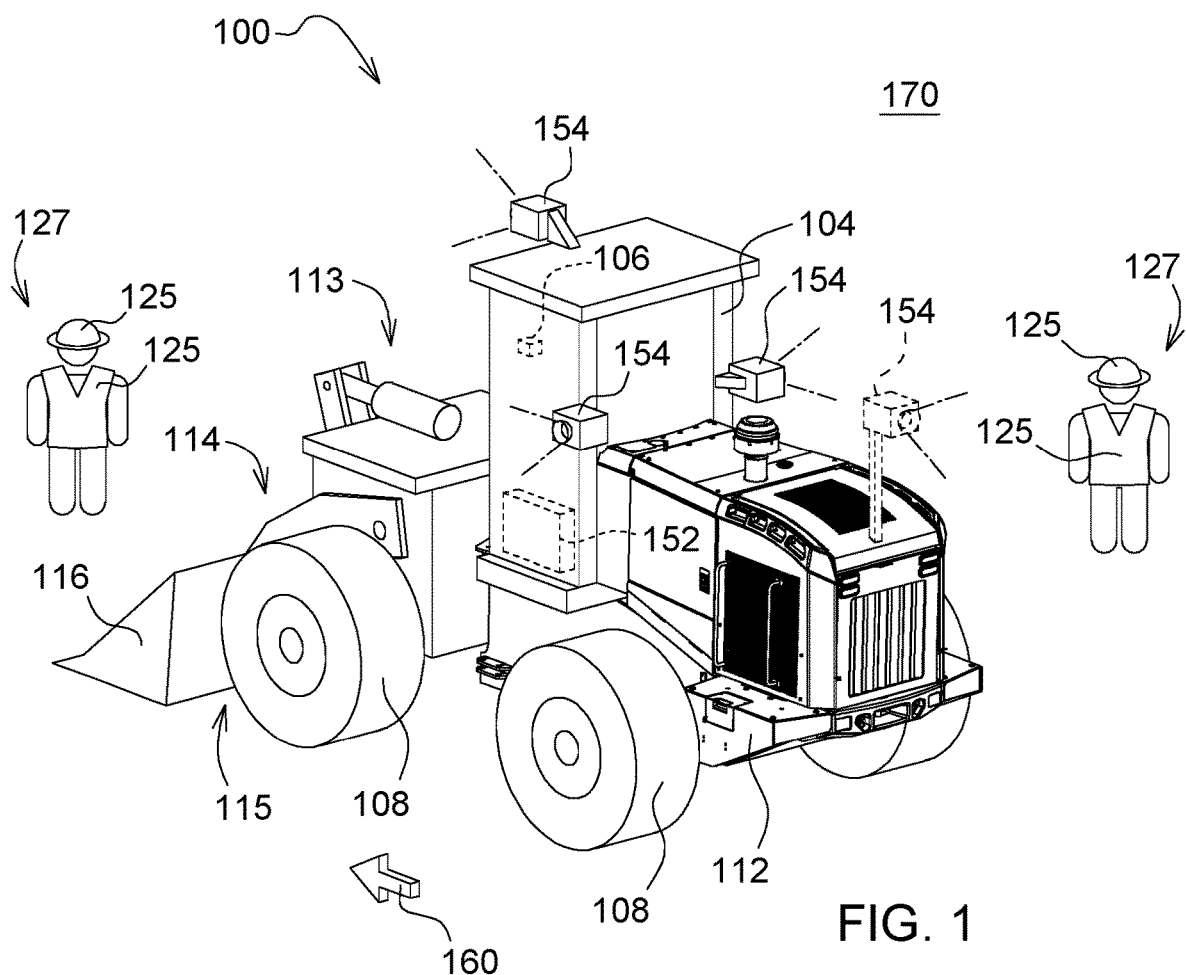
FIG. 1 is an illustration of a work vehicle including a worksite classification system according to an embodiment.
Figure 2:
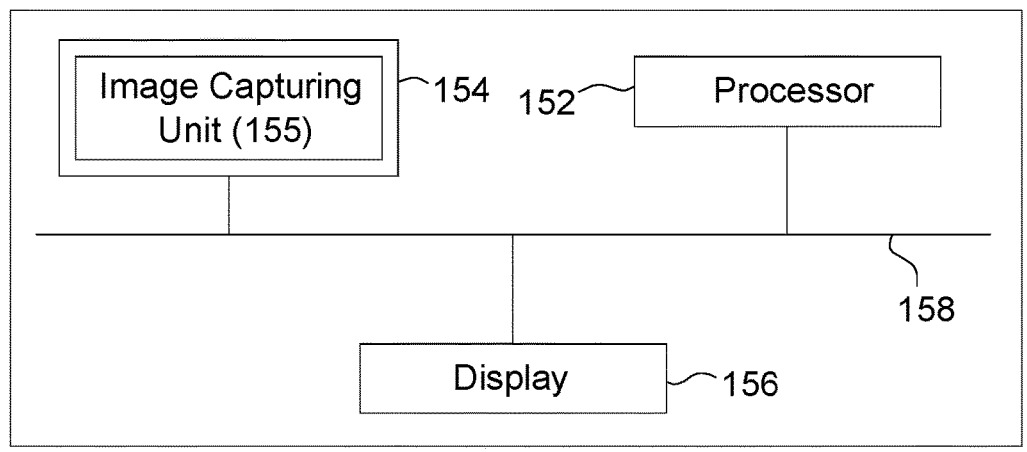
FIG. 2 is a block diagram of a worksite classification system according to an embodiment.

Referring to FIGS. 1 and 2, a work vehicle 100 having a worksite classification system 150 is shown according to an embodiment. The worksite classification system 150 monitors the activity of persons located within a worksite 170. Although the work vehicle 100 is shown as including a construction vehicle (e.g., a loader) in FIG. 1, it should be noted that, in other embodiments, the work vehicle 100 can vary according to application and/or specification requirements. For example, in other embodiments, the work vehicle 100 can include forestry, agricultural, or turf vehicles, with embodiments discussed herein being merely for exemplary purposes to aid in an understanding of the present disclosure.

The work vehicle 100 can comprise a frame 112 and an operator cab 104 supported by wheels 108. A boom assembly 114 can be coupled to the frame 112 and can extend in length between a proximal end 113 and a distal end 115. An implement 116 can be coupled to the boom assembly 114 at its distal end 115 and can comprise a conventional loader bucket as shown. It should be noted, however, that FIG. 1 is but one embodiment and, in other embodiments, the implement 116 may include a ripper, hammer, or fork, for example.

As illustrated in FIG. 2, the worksite classification system 150 can comprise a sensor system 154 communicatively coupled to an electronic data processor 152 and user interface 156 via a communication bus 158. In some embodiments, the sensor system 154 can comprise a plurality of imaging devices 155 mounted to a frame of the work vehicle 100 in various locations to capture peripheral imaging data of different operational zones of the worksite 170. For example, the imaging device 155 can be mounted to a front portion of the work vehicle 100 to capture images of surroundings and persons 125 arranged forward or to the side of the work vehicle 100. The imaging device 155 can have a wide field of view that spans approximately 90 to 180 degrees along a center axis of the device or a supporting structure attached thereto within a defined range. In other embodiments, the imaging device 155 may be optionally mounted to a rear of the work vehicle 100 to capture images of persons or other objects arranged in a rear field of view. In other alternative embodiments, the imaging device 155 can include a network of wired or wirelessly connected imaging devices 155 arranged on a plurality of work vehicles, and/or located remotely at various locations throughout the worksite 170.

Although in FIG. 1, the imaging devices 155 are shown as including cameras such as stereo cameras, it should be noted that, in other embodiments, the imaging devices 155 may also include, without limitation, thermal imagers, infrared imaging devices, light detection and ranging devices (LI-DAR), radar devices, ultrasonic devices, scanners, other suitable sensing devices, or combinations thereof. For example, as will be discussed herein, the imaging device 155 can comprise a plurality of stereo cameras that capture 2D or 3D images of the persons 127 or aerial sensing devices such as drones having one or more cameras attached thereto that capture aerial views of the worksite 170.

The electronic data processor 152 can be arranged locally as part of a vehicle electronics unit 200 (FIG. 3) or remotely at a remote processing center 222. In various embodiments, the electronic data processor 152 can comprise a microprocessor, a microcontroller, a central processing unit, a programmable logic array, a programmable logic controller, an application specific integrated circuit, a logic circuit, an arithmetic logic unit, a graphics processing unit (GPU), field programmable gate arrays (FPGAs), or other suitable programmable circuitry that is adapted to perform data processing and/or system control operations. For example, the electronic data processor 152 can process image and classification data associated with persons located in the worksite 170 and provide alerts to vehicle operators or other persons when unauthorized activity is detected.

As will be appreciated by those skilled in the art, FIGS. 1 and 2 are provided for illustrative and exemplary purposes only and are in no way intended to limit the present disclosure or its applications. In other embodiments, the arrangement and/or structural configuration of worksite classification system 150 can vary. For example, in some embodiments, the worksite classification system 150 can comprise additional sensors or may be configured to monitor activity at multiple worksites or for a fleet of work vehicles.

Figure 3:
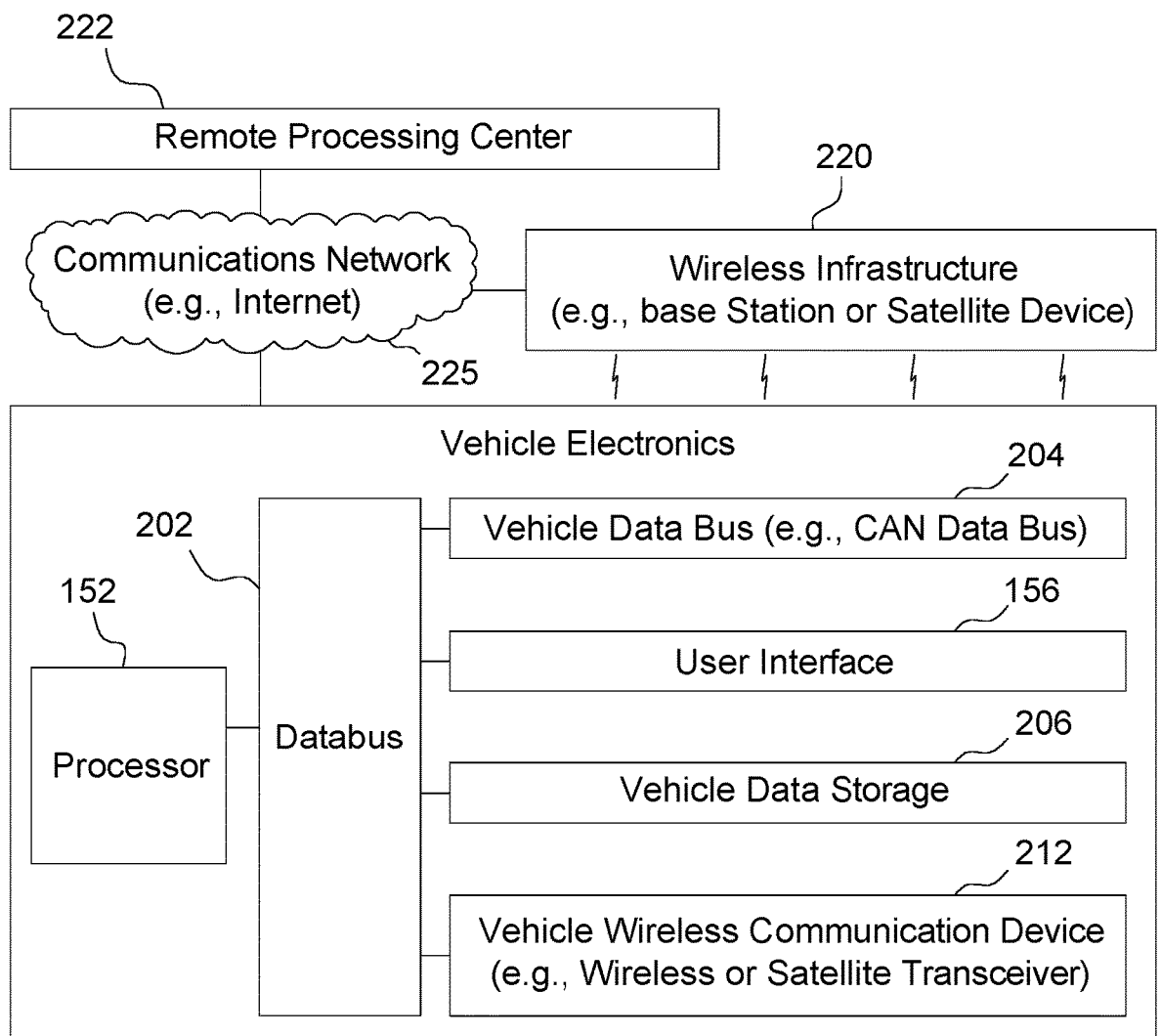
FIG. 3 is a block diagram of a vehicle electronics unit and a remote processing center according to an embodiment.

Referring now to FIG. 3, as previously discussed, the electronic data processor 152 can be arranged in the vehicle electronics unit 200 and can be configured to process images captured by the imaging device 155. For example, the electronic data processor 152 can be configured to execute a plurality of instructions stored on a vehicle data storage device 206 to classify persons arranged in the images. In addition to the electronic data processor 152, the vehicle electronics unit 200 can comprise the vehicle data storage device 206, a vehicle wireless communications device 212, an operator interface (i.e., display 106), and a vehicle data bus 204 each communicatively interfaced with a main data bus 202.

As depicted, the various devices (i.e., vehicle data storage device 206, vehicle wireless communications device 212, user interface 106, and vehicle data bus 204) may communicate information, e.g., signals such as image data over the main data bus 202 to the electronic data processor 152. In other embodiments, the electronic data processor 152 can manage the transfer of data to and from a remote processing system 222 via a network 225 and wireless infrastructure 220. For example, the electronic data processor 152 can collect and process the image data from the main data bus 202 for transmission to or from the processing center 222.

The vehicle data storage device 206 stores information and data for access by the electronic data processor 152 or the vehicle data bus 204. The vehicle data storage device 206 may comprise electronic memory, nonvolatile random-access memory, an optical storage device, a magnetic storage device, or another device for storing and accessing electronic data on any recordable, rewritable, or readable electronic, optical, or magnetic storage medium. Additionally, the vehicle data storage device 206 may include one or more software modules or data structures that record, and store data collected by the imaging device 155 or other network devices coupled to or capable of communicating with the vehicle data bus 204. For example, in some embodiments, the one or more software modules and/or data structures can comprise a classification module 207, an operational zone module 209, and an alert generation module 211, and as will be discussed with reference to FIG. 4.

Figure 4:
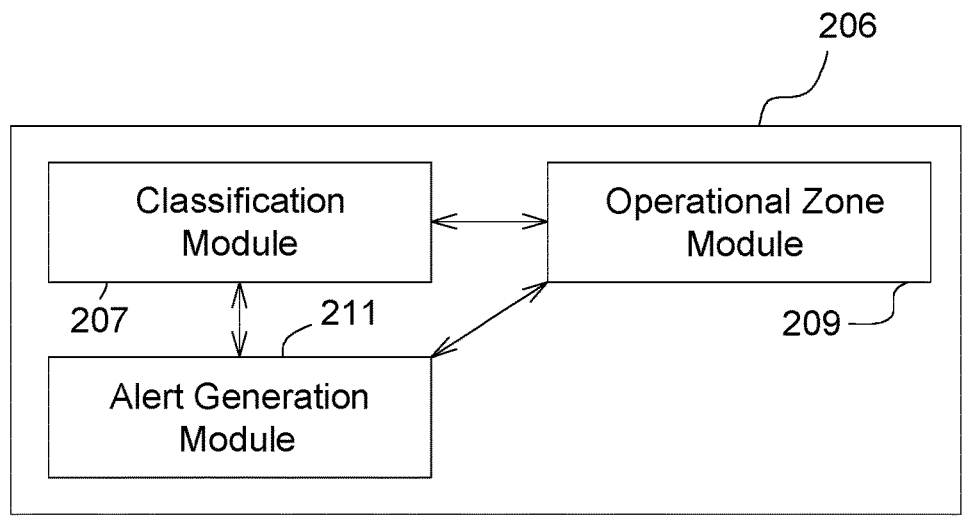
FIG. 4 is a block diagram of a vehicle data storage device according to an embodiment.

Referring now to FIG. 4, a block diagram of the vehicle data storage device 206 is shown according an embodiment. As discussed with reference to FIG. 3, the electronic data processor 152 can be configured to communicate with the vehicle data storage device 206 to access each of the modules stored therein. The vehicle data storage device 206 can comprise computer executable code that is used to implement the classification module 207, operational zone module 209, and alert generation module 211. The term module as used herein may include a hardware and/or software system that operates to perform one or more functions. Each module can be realized in a variety of suitable configurations and should not be limited to any particular implementation exemplified herein, unless such limitations are expressly called out. Moreover, in the various embodiments described herein, each module corresponds to a defined functionality; however, it should be understood that in other embodiments, each functionality may be distributed to more than one module, or multiple defined functionalities may be implemented by a single module that performs those multiple functions.

The classification module 207 can classify persons 127 located at the worksite 170 into categories based on an assigned access level. For example, in some embodiments, the persons 127 can be categorized as site personnel or pedestrians, with each having an associated access level. Site personnel can include laborers, spotters, site managers, or other personnel whose access levels (e.g., machine access or site access) are determined based on job tasks or duties. For example, the classification module 207 can assign machine access to persons who perform job tasks near the work vehicle 100 such as laborers and/or spotters (refer, e.g., to FIG. 6). Site access can be assigned to site managers and other personnel having authorization to carry out duties at the worksite 170 away from the work vehicle 100. Additionally, persons such as pedestrians or other bystanders can be classified as unauthorized with no assigned access levels.

To identify persons 127 captured in the image by the imaging device 155, the classification module 207 can comparatively analyze identifying characteristics 125 such as apparel, wearable devices, and/or facial recognition features with those stored in a database. For example, as will be discussed in further detail with reference to FIG. 7, the classification module 207 can analyze apparel items such as protective wear (e.g., hats or eyewear), uniforms, or color-coded protective vests, or facial recognition features such as the shape, size, and/or relative arrangement of the eyes, nose, mouth, and face to identify persons 127.

Figure 6:
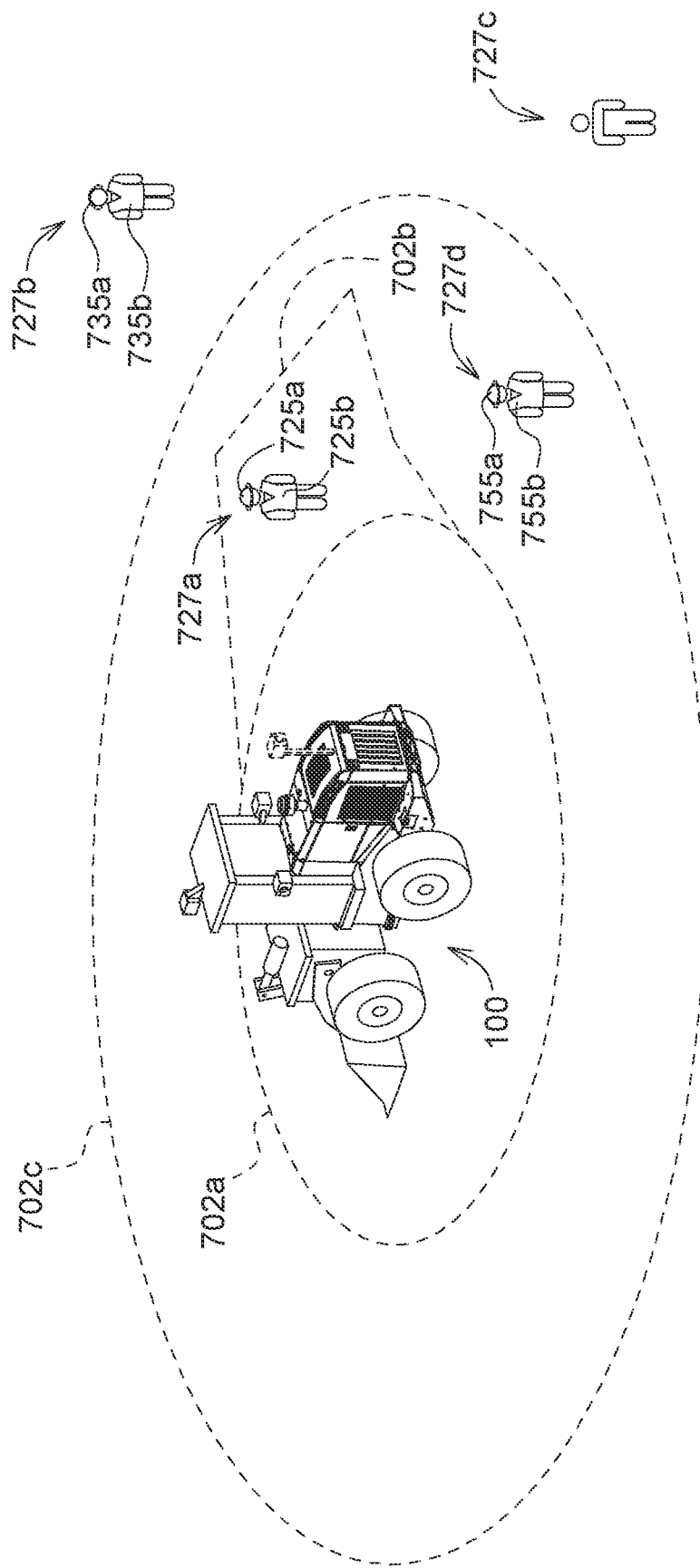
FIG. 6 is an illustration of a work vehicle having one or more defined operational zones according to an embodiment.

Additionally, a variety of wearable devices including, without limitation, headsets, speech generating devices, wearable fabrics, wrist or hand devices (e.g., smart watches), smart eyewear, Bluetooth-enabled devices, GPS tracking devices, other suitable communication devices can be used to identify the persons 127. For example, as shown in FIG. 6, personnel such as site managers 727*b* may be required to use unique headsets 735*a* or speech generating devices such as handheld transceivers to communicate with and/or to alert laborers 131, spotters 133, or other personnel located offsite.

The operational zone module 209 can communicate with the classification module 207 to define operational zones 502 around the work vehicle 100. For example, in some embodiments, the operational zone module 209 can retrieve stored boundary data from the vehicle data storage device 206 to define the one or more operational zones 502. In other embodiments, the operational zones 502 may be defined by a vehicle operator via the user interface 156.

Figure 5:
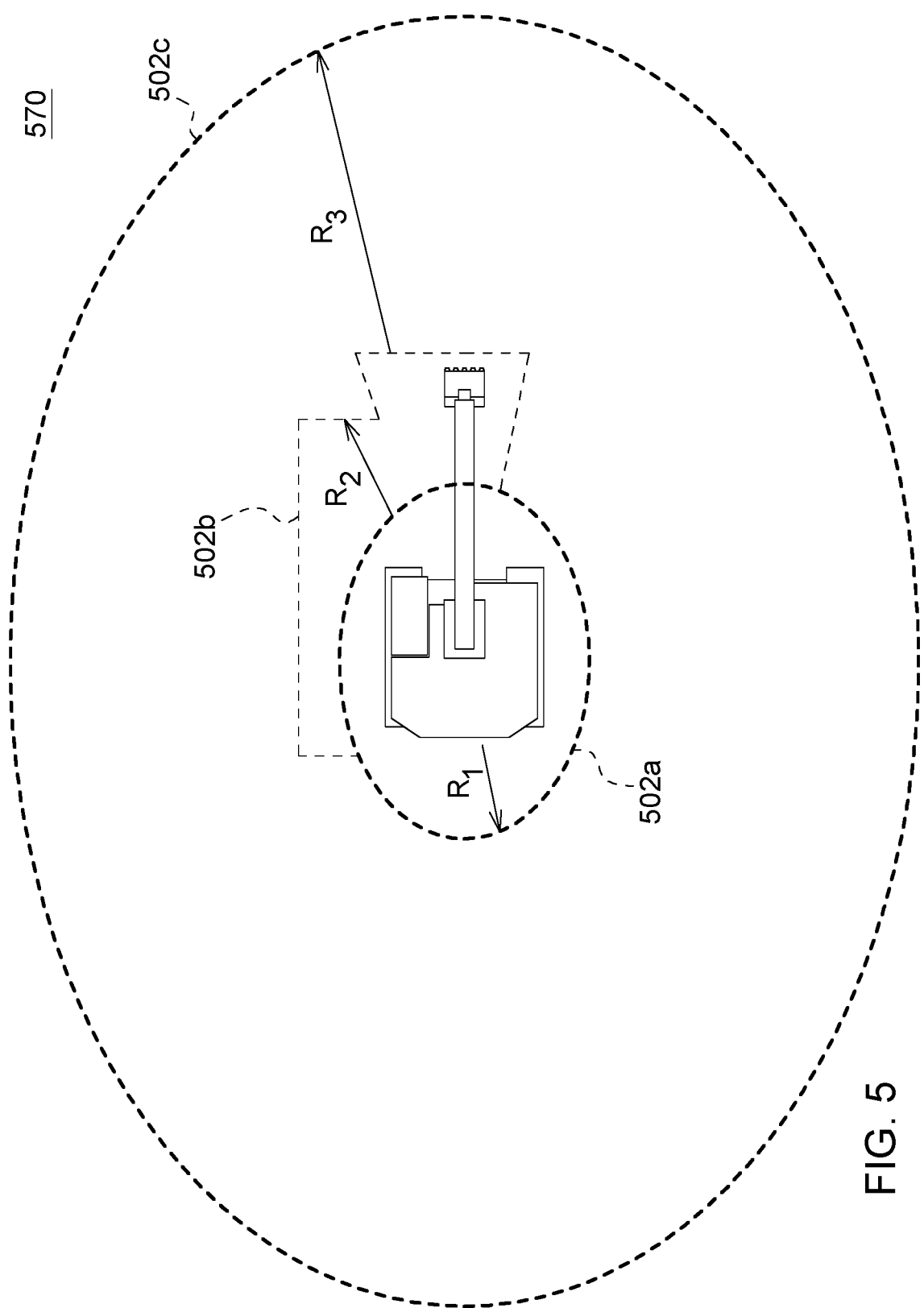
FIG. 5 is an illustration of a work vehicle having one or more defined operational zones according to an embodiment.

In some embodiments, the operational zones 502 can include a first zone 502*a*, a second zone 502*b*, and a third zone 502*c*, each having a designated access level (e.g., machine access vs site access). As shown in FIG. 5, the first zone 502*a* (e.g., a danger zone) can include a region R1 located in the immediate vicinity of the work vehicle 100. The second zone 502*b* (e.g., a work zone) can include a region R2 located outside the first zone 502*a* which may be accessible by laborers only. The third zone 502*c* (e.g., a spotter zone) can include a region R3, which is located outside each of the first and second zones 502*b* and 502*c* and may be accessible by both laborers and spotters. It should be noted that, in other embodiments, the shape, size, and location of each of the regions R1-R3 may be redefined, e.g., based on machine operations, job tasks performed by the site personnel, and/or environmental conditions of the worksite 570.

In other embodiments, the operational zone module 209 may associate one or more attributes with each of the operational zones 502 based on the different zone access levels. For example, in one non-limiting example, the one or more attributes can include a color (e.g., red, orange, and yellow) that are displayed on the user interface 156. For example, the operational zone module 209 can associate red with the first zone 502*a*, which is characterized as a danger zone and restricted area. Similarly, caution indicating colors such as orange and yellow can be associated with less hazardous areas such as the second and third zones 502*b*, 502*c*. In other embodiments, fewer or more colors or other attributes such as location, vehicle identification, or operational status can be used to categorize the different operational zones 502.

The alert generation module 211 can communicate with the classification module 207 and the operational zone module 209 to generate a plurality of alerts associated with the different operational zones 502 and access levels. For example, the alert generation module 211 can generate a first group of alerts (e.g., high level alerts) that are associated with the first zone 502*a*, and a second group of alerts that are associated with each of the second and third zones 502*b*, 502*c*. In various embodiments, the alerts can include, without limitation, visual alerts, audible alerts, haptic alerts, tactile alerts, or combinations thereof that activate in response to detected zone access. For example, the alert generation module 211 can associate one or more high level alerts with the first zone 502*a*, including visual or audible alerts such as strobe lights or sirens, that trigger when persons 127 are detected in the first zone 502*a*. Similarly, medium to low level alerts can be associated with the second and third zones 502*b*, 502*c* based on the access levels for each of the zones. For example, in one embodiment, a tactile alert such as seat vibration can be activated when one or more persons 127 enter the second zone 502*b* or the third zone 502*c*.

Figure 7:
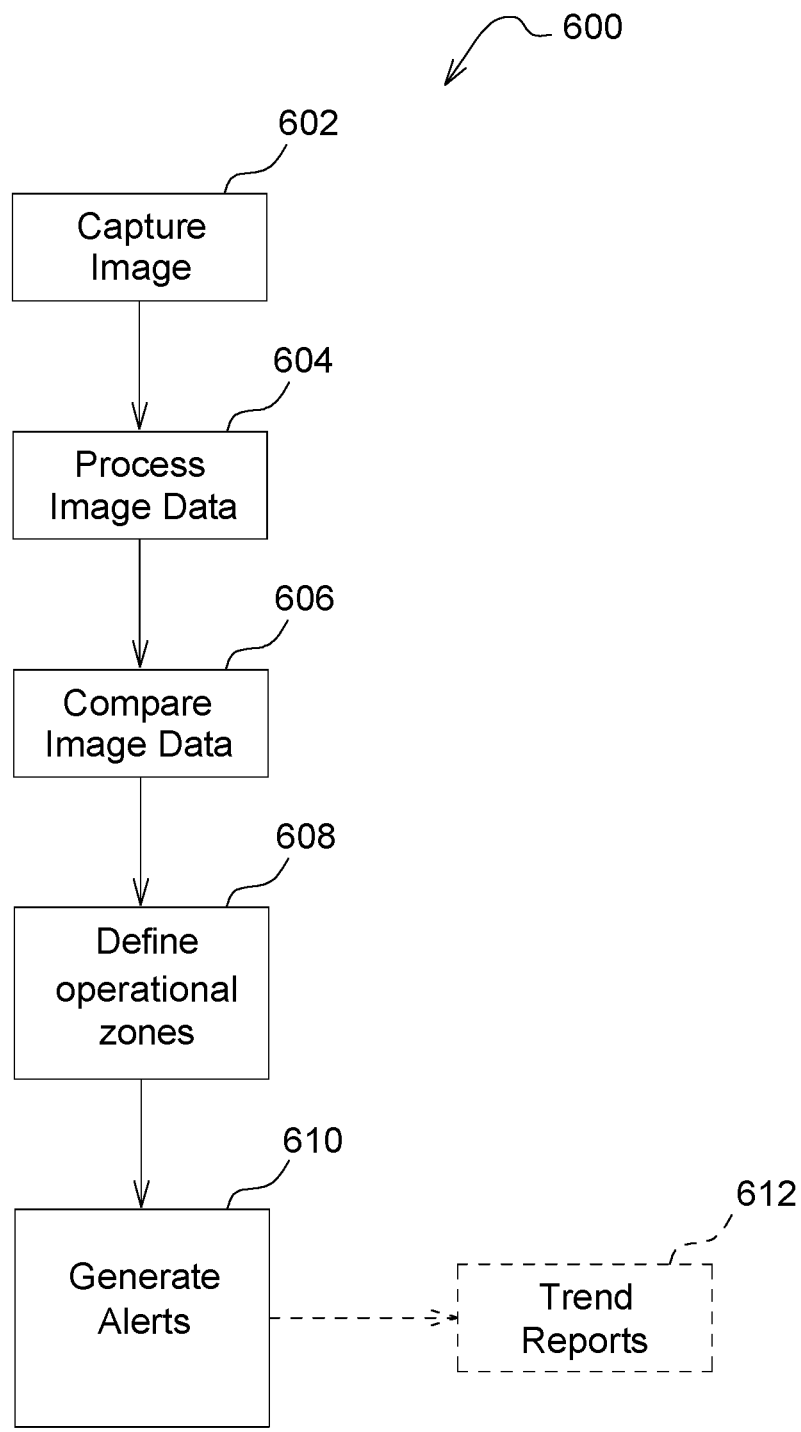
FIG. 7 is a flow diagram of a method for classifying persons located in a worksite.

In operation, referring now to FIG. 7, a flow diagram of a method 600 for classifying persons 127 located in a worksite such as worksite 170 is shown. At 602, the imaging device 155 can be configured to manually or automatically span a defined range within, e.g., a 90 to 180° radius to capture images of persons 127 located in the worksite 170. For manual operations, an operator can input an initiation command via the user interface 156 to activate the imaging device 155. For example, in some embodiments, an operator can access a setup screen 756 (FIG. 8) via the user interface 156 to input setup information in response to a sequence of prompts such as will be discussed below. In other embodiments, such as when the system is in automatic mode, the imaging device 155 can be configured to receive an initiation bit or handshake from the electronic data processor 152 upon vehicle startup to begin capturing image data. This, in turn, also adjusts the field of view based on a detected scenery or surroundings.

Once the images are captured at 602, the image data is transmitted to the electronic data processor 152 for processing at 604. As discussed with reference to FIG. 4, each of the modules (i.e., the classification module 207, the operational zone module 209, and the alert generation module 211) can be configured to implement various functionalities and interface with one another to classify the persons 127 located in the worksite 170 and define operational zones 502, 802 around work vehicles such as work vehicle 500 or 800.

At 606, a comparative analysis of the captured image and stored reference data is performed by the electronic data processor 152 to classify each of the persons 127 located in the image. As previously discussed, the classification module 207 can classify the persons 127 as site personnel or pedestrians based on an assigned access level (e.g., machine access, site access, no access). For example, the electronic data processor 152 can execute instructions on the classification module 207 to determine if persons 727 captured in the images are laborers, spotters, site managers, or pedestrians by analyzing one or more identifying characteristics 125 associated with each. For example, by analyzing facial features or apparel worn by persons 727*a* and 727*d* such as the protective vests 725*a*, 755*a* and protective hats 725*b*, 755*b* the electronic data processor 152 can determine that person 727*a* is a laborer and person 727*d* is a spotter. Additionally, person 727*b* can be characterized as a site manager based on an analysis of identifying characteristics 735 (i.e., headset 735*a* and protective vest 735*b*). A similar analysis can be performed to determine that person 727*c* is a pedestrian which should not be on site. The classification module 207 may also utilize machine learning or other data processing techniques to fuse the image data with other sensor data for a more comprehensive perception feature set.

Figure 9:
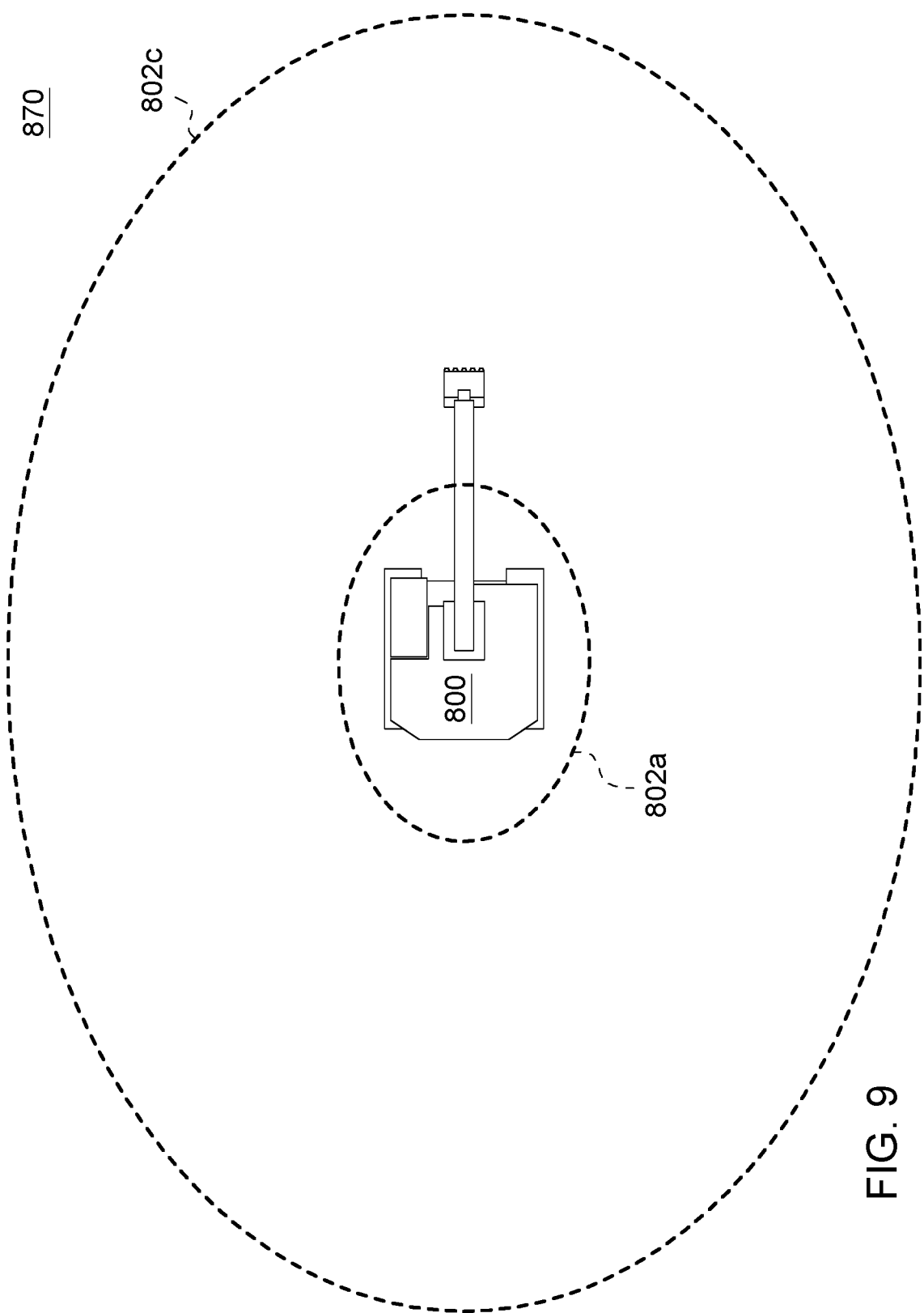
FIG. 9 is an illustration of a work vehicle having one or more defined operational zones according to an embodiment.

Next at 608, the electronic data processor 152 can determine which operational zones 502 are associated with the persons classified by the classification module 209. As previously discussed, in some embodiments, the operational zone module 209 can retrieve stored maps and data to define the operational zones 502 around the work vehicle 500. In other embodiments, the one or more operational zones 502 can be defined by an operator via the user interface 156. For example, the operator may define boundaries of the operational zones 502 by selecting one or more points or coordinates in specific locations around the work vehicle 500. The various regions R1-R3 of the operational zones 502 can be reconfigured, reshaped, or resized by the electronic data processor 152 or a vehicle operator based on the work vehicle type. For example, as shown in FIG. 9, fewer operational zones 802 may be configured for a work vehicle 800 such as a loader or others.

Referring now to FIGS. 6 and 7, in some embodiments, the operator can assign persons 727a-d to one or more of the operational zones 702 based on their classification (e.g., laborer, spotter, site manager). The operator may receive one or more prompts 760 via the user interface 756 that allows the operator to assign the site personnel such as laborer 727a or spotter 727d to the operational zones 502. For example, in one embodiment, the operator can assign laborer 727a exclusively to the second zone 502b and both laborer 727a and spotter 727d to the third zone 502c. The operator can further indicate a type of job task to be performed by persons 127, 727. For example, the operator can indicate that laborer 727a is authorized to perform trench operations with the second zone 502b or third zone 502c. In other embodiments, the zone assignments and characterizations may vary such that fewer or more persons are assigned to each operational zone.

The alert generation module 211 can communicate with the classification module 207 and the operational zone module 209 to generate a plurality of alerts when persons 127 with unauthorized access are detected within the different operational zones 502 and regions R1-R3. For example, the alert generation module 211 can associate a first group of alerts (e.g., high level alerts) with the first zone 502a that activate in response to any detected unauthorized activity within region R1. A second group of alerts can be associated with each of the second and third zones 502b, 502c and activated in response to detected unauthorized activity within regions R2 or R3. The first or second group of alerts can include, without limitation, visual alerts, audible alerts, haptic alerts, tactile alerts, or combinations thereof.

Once activity is detected in the one or more operational zones 502, 702, 802 the electronic data processor 152 generates a variety of alerts via the alert generation module 211 to notify operators of unauthorized zone access or of other activities occurring in the worksite 170, 570, 770, 870 at 610. For example, in some embodiments, audible alerts can include beeps, tones, or alarms, or verbal notifications that are activated when unauthorized activity is detected in either of the first, second, or third zones shown in FIGS. 5,6, and 9. Audible alerts can also include subtle "reminder" tones or notifications that are activated when authorized persons enter an assigned operational zone. For example, a tone alert may sound when the laborer 727a enters the second or third zone 702b or 702c. Visual alerts such as intense strobe lights can be activated in response to a detected object presence with an unauthorized area such as the first zone 502a, 702a, 802a. Such alerts may also include a subtle "reminder" light when authorized person (e.g., laborer or spotter) enters an assigned zone. In other embodiments, operators may also be notified by tactile alerts such as vibrating seats or other physical notifications.

The alerts can be generated from a variety of sources including, without limitation, the work vehicle monitoring the activity (e.g., work vehicle 100), portable devices such as pagers, cell phones, or beacons/RFIDs, dedicated infrastructure (e.g., light pole, base stations), or aerial sensing devices (e.g., drones). For example, in some embodiments, the aerial sensing devices (not shown) can be configured to begin video recording or deploy in response to an alert. In other embodiments, the aerial sensing devices can be deployed to hover over and deliver audible alerts to persons 127, 727 who may have entered one or more operational zones without authorization access. In other alternative embodiments, the aerial sensing devices can be configured to record live video streams that are provided to site management for awareness, or which can be used as a two-way audio communication between a pedestrian and site manager. For example, the site manager 727 can use the aerial sensing device to alert the pedestrian 727c and prevent entry of the pedestrian 727c into the worksite.

As discussed with reference to FIG. 4, the alerts can be characterized based on the different operational zones 502 and access levels associated with each. For example, the first group of alerts associated with the first zone 502a can be activated when any person 127, 727 enters the first zone 502a. Additionally, in some embodiments, the electronic data processor 152 can enable a machine interlock that automatically stops movement of the work vehicle 100 in response to a detected unauthorized access. The second group of alerts associated with the second zone 502b and third zone 502c can be activated based on the access levels assigned to each of the zones.

For example, because, in some embodiments, access to the second zone 502b is limited to laborers, alerts can be activated if a spotter, site manager or other unauthorized person enters the second zone 502b. Similarly, because access to the third zone 502c is limited to laborers and/or spotters, alerts can be activated in response to all other unauthorized entries in the third zone 502c.

In other embodiments, the first and second groups of alerts can be reconfigured or defined specific to the work vehicle 100, which may vary in size and shape, or operations being performed. For example, referring to FIG. 9, for a work vehicle 800 such as a 4WD loader (FIG. 1), crawler, or an articulated dump truck, the first group of alerts associated with the first zone 802a are the same as those discussed above. The second group of alerts, however, can be optionally deactivated for the second zone and triggered only when unauthorized persons enter the third zone 802c.

In still other embodiments, in addition to the alert notifications, vehicle parameters can be modified based on detected activity within operational zones 502, 802. For example, in response to a laborer entering the second zone 502b or 802c, the electronic data processor 152 can generate an output signal received by a vehicle controller that reduces a speed (e.g., maximum speed reduced to half) or limits an acceleration of the work vehicle 100. Additionally, if a laborer 727a or other person enters the first zone 502a or 802a, movement of the work vehicle 100 can be inhibited as previously discussed or an operator may receive a prompt via the user interface 156 to assign an additional laborer to the zone and/or to adjust a size, shape, or radius of zone.

Figure 10A:
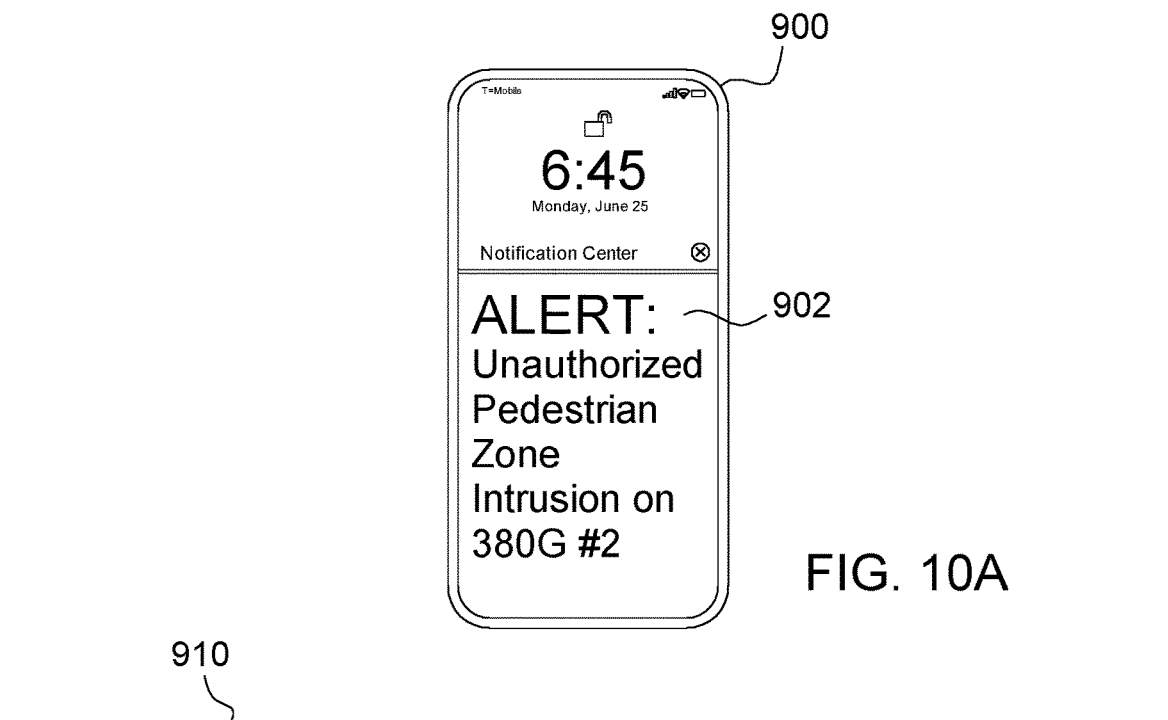
FIG. 10A is an illustration of a notification screen display of a user interface of the worksite classification system of FIG. 2 according to an embodiment.
Figure 10B:
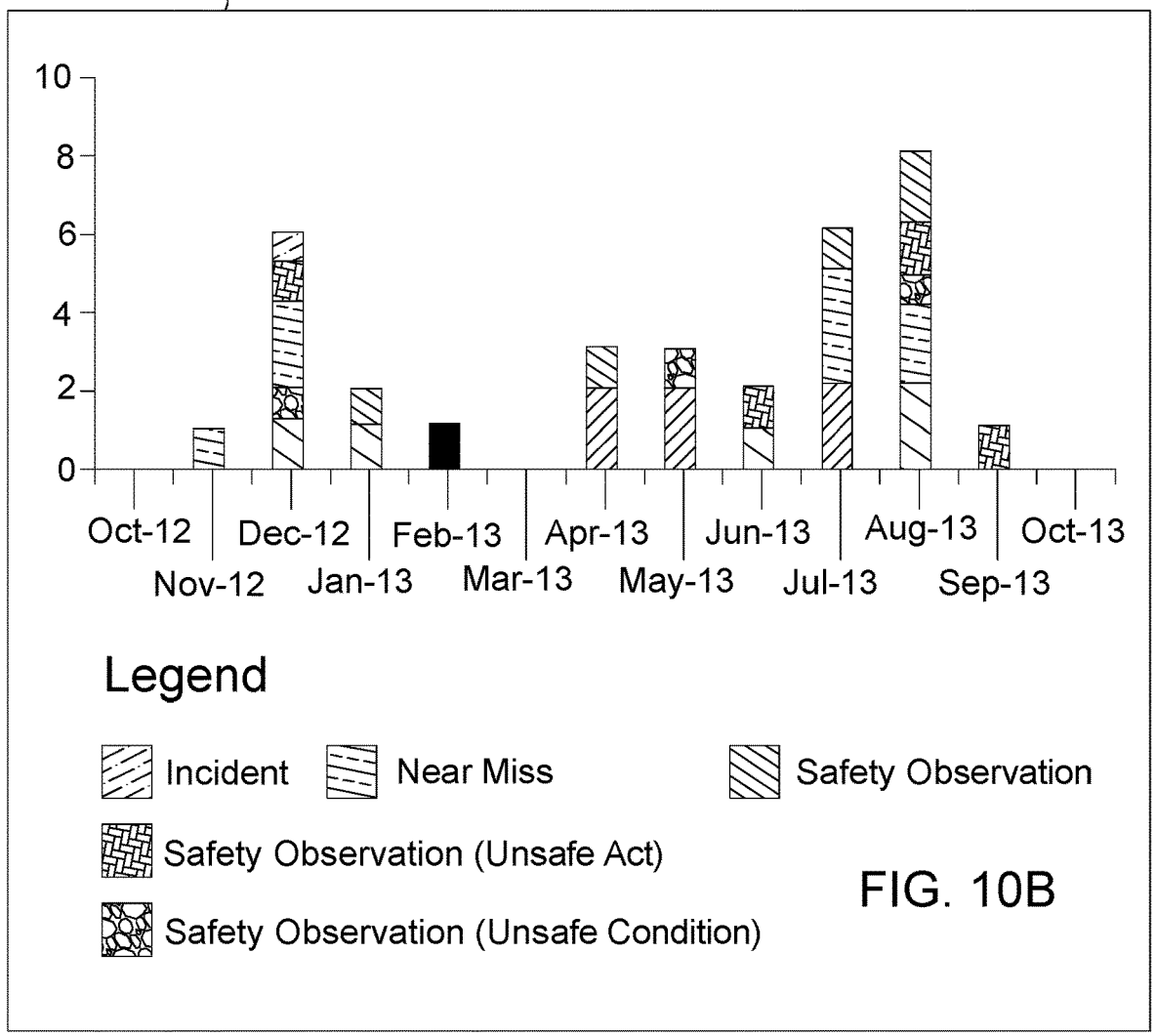
FIG. 10B is an illustration of a report screen display of a user interface of the worksite classification system of FIG. 2 according to an embodiment.

Referring now to FIGS. 10A and 10B, in some embodiments, alert data can be reported in real-time and displayed on the user interface 156, a mobile device (e.g., mobile device 900), or transmitted to the remote processing center 222. For example, as shown in FIG. 10A, instant alerts such as notification 902 can be sent to site managers or vehicle operators when an unauthorized entry is detected by electronic data processor 152 in either of the first zone 502a, second zone 502b, or third zone 502c. Additionally, in other embodiments, the worksite classification system 150 can further comprise a reporting system that tracks data such as near misses or the number of unauthorized zone entries per day, week, machine, etc., and generates reports such as the trend report displayed on a display screen 910 at 612. In other alternative embodiments, the imaging devices 155 can comprise a plurality of stereo cameras that are configured to provide security surveillance the worksite 170 and vehicle surroundings when the work vehicle 100 is an off-mode and not in use.

Once the alert data is generated, the process steps 602-610 may be iteratively repeated and various machine learning and artificial intelligence techniques can be applied to train the classification module 207 to develop models of the classification data.

Without in any way limiting the scope, interpretation, or application of the claims appearing below, a technical effect of one or more of the example embodiments disclosed herein is a worksite classification system and method. The worksite classification system and method are particularly advantageous in that it provides real-time monitoring of an industrial worksite by generating alerts and warnings when unauthorized persons are located in operational zones around the work vehicle.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A worksite classification system for a work vehicle for classifying persons at a worksite, the worksite classification system comprising:
    a sensor system configured to capture images of persons located at the worksite;
    an electronic data processor communicatively coupled to the sensor system, the electronic data processor comprising a non-transitory computer readable storage medium having machine readable instructions that, when executed by the electronic data processor, cause the electronic data processor to:
        determine an identity of the persons based on one or more identifying characteristics associated with the persons;
        determine if the persons have authorization access to enter to one or more operational zones at the worksite based on the identity of the persons and an associated access level; and
        generate an alert notifying an operator when persons without authorization access enters the one or more operational zones;
    wherein the electronic data processor is further configured to generate a control signal to modify a vehicle parameter of the work vehicle or an implement coupled to the work vehicle when persons without authorization access enters the one or more operational zones.

2. The worksite classification system of claim 1, wherein the sensor system comprises a plurality of imaging devices operably coupled to the work vehicle, wherein the plurality of imaging devices are configured to capture stereographic images or videos of persons located at the worksite.

3. The worksite classification system of claim 2, wherein the plurality of imaging devices are configured to provide security surveillance of the work vehicle surroundings when the work vehicle is in an off mode.

4. The worksite classification system of claim 1, wherein the one or more operational zones comprise a first zone, a second zone, and a third zone, and wherein the authorization access for each of the first zone, the second zone, and the third zone is determined based on the identity of the persons and an associated job task.

5. The worksite classification system of claim 1, wherein determining the identity of the persons comprises determining if the persons are pedestrians or site personnel including at least one of a laborer, a spotter, or a site manager.

6. The worksite classification system of claim 1, further comprising a user interface, wherein the associated access level is selected by an operator via the user interface based on an assigned job task.

7. The worksite classification system of claim 1, wherein the identifying characteristics comprises at least one of apparel, wearable devices, facial recognition characteristics, or combinations thereof.

8. The worksite classification system of claim 1, wherein generating the plurality of alerts comprises generating at least one of audible alerts, visual alerts, haptic alerts, tactile alerts, or combinations thereof.

9. The worksite classification system of claim 8, wherein generating visual and audible alerts comprises activating a strobe light on the work vehicle or triggering a sound file to notify a vehicle operator when a pedestrian is located within at least one of the operational zones.

10. The worksite classification system of claim 1, wherein generating an alert comprises deploying a drone to generate an audible alert when persons without authorization access enters the one or more operational zones.

11. The worksite classification system of claim 1, further comprising a reporting system configured to generate trend data based on the plurality of alerts for display on a user interface, wherein the trend data includes information such as near misses or the number of unauthorized zone entries per day, per week, per work vehicle, or combinations thereof.

12. The worksite classification system of claim 1, wherein modifying a work function of the work vehicle comprises reducing a speed or an acceleration of the work vehicle or the implement, rate limiting the acceleration up to a maximum speed, disabling operations of the implement, or stopping movement of the work vehicle.

13. A method, the method comprising:
    capturing images of persons located in one or more operational zones at a worksite;
    determining an identity of the persons captured in the image based on one or more
    identifying characteristics associated with the persons;
    determining, based on the identity of the persons and an associated access level, if the persons have authorization access to enter the one or more operational zones;
    generating an alert to notify an operator when persons without authorization access enters the one or more operational zones; and
    modifying a vehicle parameter of the work vehicle when the presence of the persons is detected within a first zone of the one or more operational zones, and wherein modifying a vehicle parameter of the work vehicle comprises reducing a speed or an acceleration of the work vehicle or the implement, rate limiting the acceleration up to a maximum speed, disabling operations of the implement, or stopping movement of the work vehicle.

14. The method of claim 13, wherein capturing images of persons comprises capturing stereographic images or videos of persons by a plurality of imaging devices.

15. The method of claim 13, wherein the identifying characteristics comprises at least one of apparel, wearable devices, facial recognition characteristics, or combinations thereof.

16. The method of claim 13, wherein generating an alert comprises activating a strobe light on the work vehicle or triggering a sound file to notify a vehicle operator when a pedestrian is located within at least one of the operational zones.

17. The method of claim 13, wherein generating an alert comprises deploying a drone to generate an audible alert when persons without authorization access enters the one or more operational zones.

* * * * *